Dec. 13, 1960 A. J. GAREY 2,964,015
SHAFT ADJUSTING MECHANISM
Filed July 16, 1956 2 Sheets-Sheet 1

INVENTOR.
ALBERT J. GAREY.
BY Flam and Flam
ATTORNEYS.

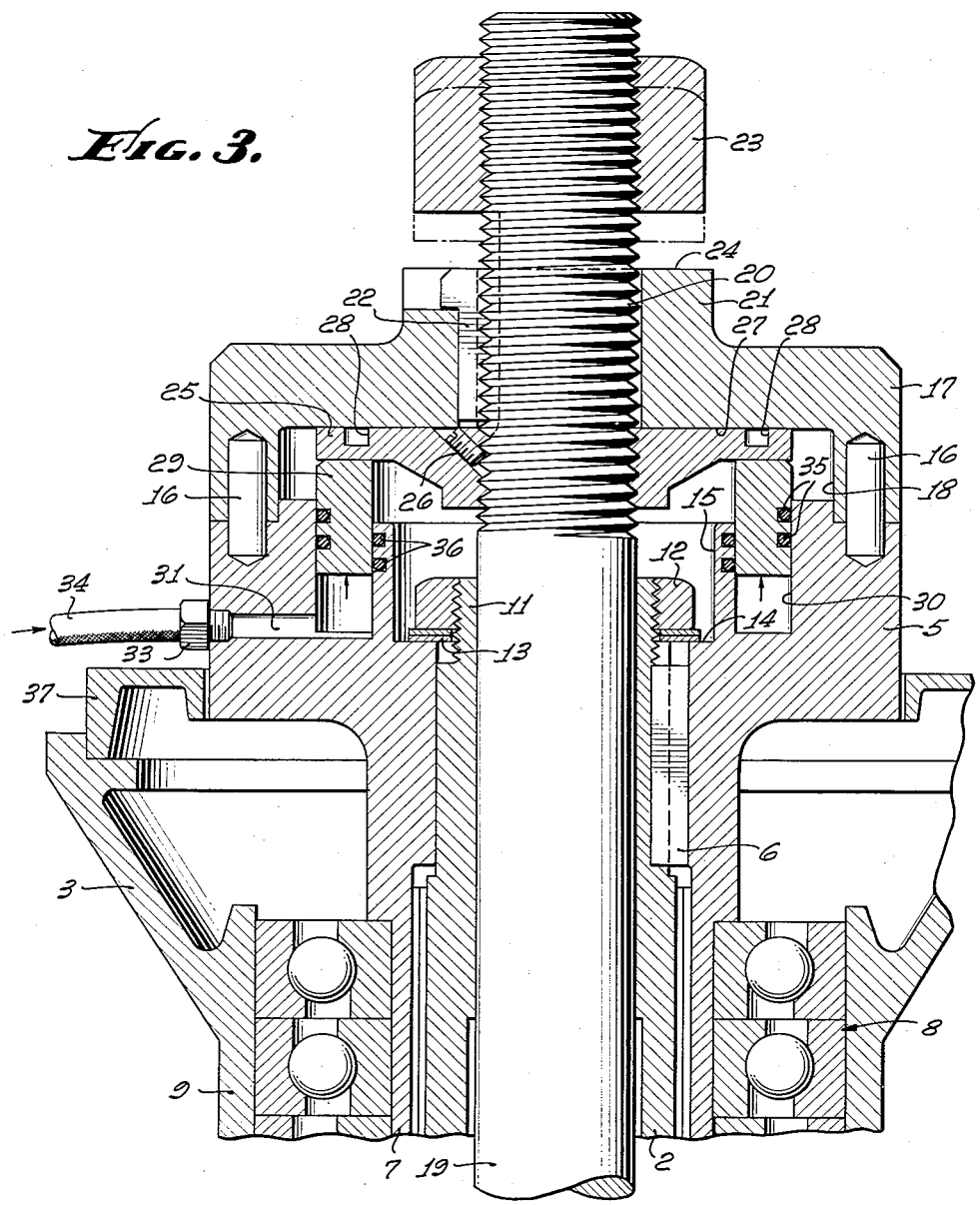

United States Patent Office 2,964,015
Patented Dec. 13, 1960

2,964,015

SHAFT ADJUSTING MECHANISM

Albert Jack Garey, Los Angeles, Calif., assignor to U.S. Electrical Motors, Inc., Los Angeles, Calif., a corporation of California Filed July 16, 1956, Ser. No. 598,016

11 Claims. (Cl. 121—40)

This invention relates to shafts, that require axial adjustment.

An example of such shafts is one that carries pump runners, operating in a pump casing. Usually such shafts are arranged vertically, the runners being disposed underground in a well. In this way, it may be ensured that the runners are in proper clearance relation to the housing or bowl encasing the runner. A vertical motor is connected to the runner shaft (often called the "head shaft") by the aid of a supplemental hollow shaft that is operatively coupled to the head shaft.

It is common to provide an adjusting nut threaded on the upper end of the shaft, and engaging a horizontal surface carried by the hollow shaft. Since the head shaft may be quite extended, representing considerable mass, rotation of the nut is resisted by the friction between the engaging surfaces of the nut and the horizontal surface. Rotation of the nut with respect to the surface, for adjustment purposes, is accordingly difficult. But, in addition, the nut may scrape and spall the horizontal surface; and this often occurs. Permanent injury to the parts is therefore substantially inevitable. Furthermore, there is considerable friction within the threads of the nut during adjustment.

It is one of the objects of this invention to facilitate the adjustment of the shaft, eliminating spalling and the static strains, and particularly by providing a simple lifting mechanism for temporarily elevating the shaft, so as to raise the nut above the horizontal surface. When in this position, the nut may be turned on the shaft with ease to correspond to the desired adjustment; and after this operation is completed, the shaft is lowered so that the nut rests again on the horizontal surface. All this may be accomplished without the necessity of holding the hollow shaft or head shaft against rotation.

It is another object of this invention to provide within the motor a simple and inexpensive hydraulic mechanism for performing the lifting operation.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 3 is an enlarged fragmentary sectional view, similar to Fig. 1, showing the head shaft in elevated position for adjustment purposes.

Figure 1:
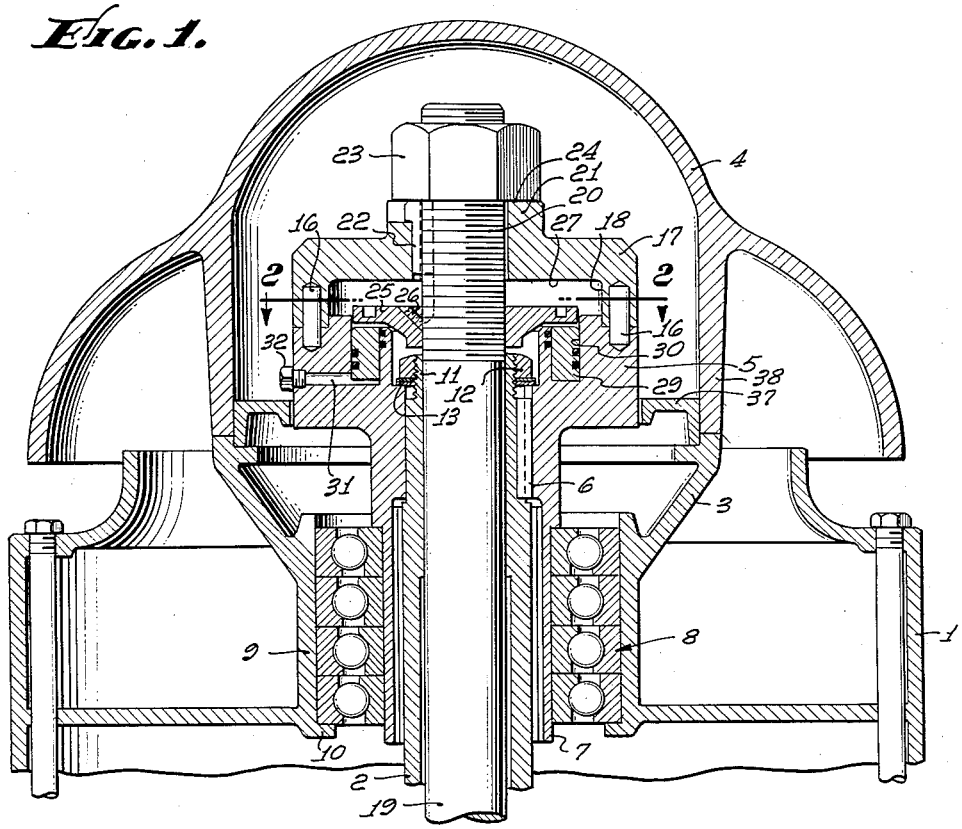
Figure 1 is a fragmentary longitudinal sectional view, taken through the upper part of an electric motor incorporating the invention.
Figure 2:
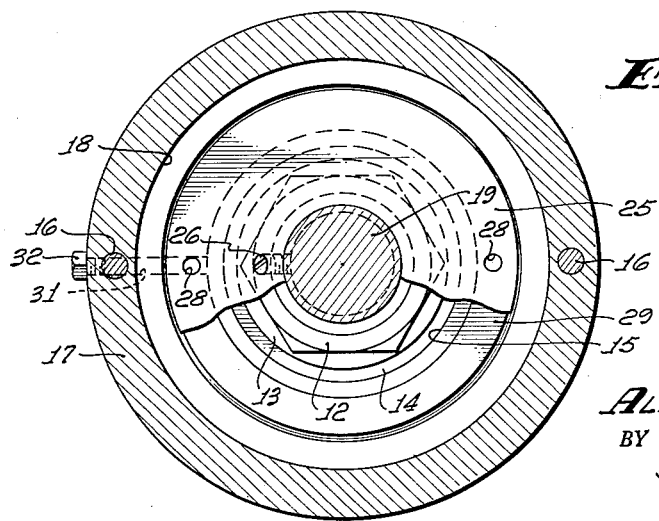
Fig. 2 is an enlarged cross-sectional view, taken along a plane corresponding to line 2—2 of Fig. 1.

A casing 1 (Fig. 1) is located at the top of a well and encloses elements of an electric motor driving a hollow shaft 2. The casing 1 has an annular wall 3 upon which the bell-shaped cover 4 is supported. Appropriate attaching means may be utilized to hold this cover 4 in place.

The hollow shaft 2 is joined to a lower drive coupling member 5, as by the aid of a key 6. A dust ring 37 extends in the annular space between the lower drive coupling 5 and a flange 38 formed in the bell 4.

The coupling member 5 has a downwardly extending portion 7 to support the inner races of a series of thrust ball bearing structures 8. The outer races for these bearings are supported by the aid of the wall 9, formed integrally with the casing 1 and joined to the wall 3. A lower flange 10 serves as a rest for the series of ball bearing structures 8.

The hollow shaft 2 has an upper threaded portion 11 engaged by a hollow nut 12. This hollow nut 12 serves to hold the hollow shaft 2 in position with respect to the lower drive coupling 5. Washers 13 are interposed between the nut 12 and the horizontal surface 14. This horizontal surface 14 is formed by the aid of a recess 15 formed centrally of the lower drive coupling 5.

The lower drive coupling 5 is drivably joined, as by one or more pins 16, with a top drive coupling 17. Accordingly, this top drive coupling is driven from the electric motor by the aid of the hollow shaft 2. This drive coupling has a recess 18 providing clearance between it and the lower drive coupling 5.

A head shaft 19 is adjustably telescoped within the hollow shaft 2 and is connected at its lower end to the pump runners. The upper end 20 of this shaft 19 passes through the boss 21 formed integrally with the top drive coupling 17. This upper portion 20 is coupled by the aid of a key 22 to the top drive coupling 17. An adjusting nut 23 is mounted on the threaded portion 20 and its lower surface, in normal running position, bears upon the horizontal upper surface 24 of the boss 21.

As hereinabove described, the motor-driven hollow shaft 2 is placed in driving relation to the head shaft 19 by the aid of the lower drive coupling 5, pins 16, top drive coupling 17 and key 22.

The structure as thus far described is quite similar to known hollow shaft drives for hydraulic pumps.

In the past, it has been customary axially to adjust the head shaft 19 by rotating the nut 23 clockwise or counterclockwise to raise or lower the shaft 19. This would necessitate that the hollow shaft 2 be somehow restrained against rotation, as by means of holding the drive coupling 17. Furthermore, due to the mass of the shaft 19 and its associated parts, the relative rotation of nut 23 on the surface 24 inevitably caused spalling, and consequent roughening of the surface 24.

In accordance with this invention, for adjusting the shaft 19, it is first raised to the position shown in Fig. 3 by means to be hereinafter described. When it is in this raised position, the nut 23 can be freely adjusted on the threaded extension 20, to provide the proper adjustment of the shaft 19. Then the shaft 19 can be lowered to the position determined by the engagement of the nut 23 with the surface 24.

This lifting step is effected by the aid of a hydraulic mechanism. Thus a collar 25 is threaded to extension 20 of the shaft 19, and is held in place by the aid of a set screw 26. The upper surface of this collar 25 has clearance with respect to the lower surface 27 of the top drive coupling 17 so that it may be raised upwardly to a maximum height, as indicated.

Diametrically opposite apertures 28 on the collar 25 permit the use of a spanner wrench for turning the collar 25 on the threads of the extension 20.

Adapted to engage the lower surface of the collar 25 is a ring-like or annular piston 29. This piston extends around the shafts 2 and 19 and is accommodated in an annular space 30 formed in the lower drive coupling 5.

This piston 29 may be urged by hydraulic pressure upwardly with respect to the space 30 as by the aid of fluid under pressure acting through a port 31 extending horizontally outwardly from the space 30. When adjustment is required, a plug 32 closing the port 31, may be removed and instead a coupling 33 (Fig. 3) may be utilized to couple a hose 34 to the port 31. The grease or other fluid material can be applied under pressure through the hose 34 and port 31 to raise the annular piston 29. The application of pressure may be manually operated as, for example, by a conventional form of grease gun or the like.

Piston 29 may be moved thereby upwardly to lift the shaft 19 and its associated parts almost to the horizontal surface 27. When in this raised position, the nut 23 may be readily adjusted to the desired amount. Then the pressure exerted upon the grease in the annular passageway 30 may be appropriately released as by retraction of the grease gun piston. The shaft 19 then lowers to a position determined by the adjusted position of the nut 23.

In order to provide a fluid-tight annular channel formed by the passageway 30, the outer periphery of the piston 29 may be provided with grooves accommodating one or more O-rings 35. Similar O-rings 36 may be provided within the inner wall of the passage 30.

The method of adjustment may now be set forth. Let us assume that it is required to adjust the position of the shaft 19. The plug 32 is first removed. A grease applicator or other pressure-producing device is then placed in operative position with the port 31 as by the aid of coupling 33. Pressure is now exerted so as to urge the ring 29 upwardly to engage the lower surface of the collar 25 and to raise the collar with the shaft 19. The limit to which the shaft 19 may be raised corresponds to the vertical separation between the top surface of coupling member 5 and the lower surface 27 of the top drive coupling 17. The limiting position is illustrated in Fig. 3, although the collar 25 may be raised to a slightly less extent than that indicated.

When so raised, it is a simple matter, because of eliminating the load from the nut, to rotate the nut 23 with respect to the shaft 19 and bring it to the desired vertical position. Then the lifting pressure may be relieved, and the collar 25 lowered to the position of Fig. 1.

The inventor claims:

1. In an adjustable coupling for the vertical head shaft of a pump structure: a hollow driving shaft for the head shaft, extending about the upper end of the head shaft; an axially slidable coupling between the head shaft and the hollow shaft; a nut carried at the end of the head shaft; means providing a surface with respect to which the head shaft is axially movable and upon which the nut is adapted to rest; and hydraulic means for lifting the head shaft and the nut from the surface for ready adjustment of the nut, comprising a hydraulic cylinder and piston located below said coupling; said piston being normally disconnected from the head shaft.

2. In an adjusting mechanism for a shaft having a threaded portion, and engaged by a nut: means defining a first surface from which the shaft extends; said nut serving as an abutment against said first surface; means defining a second surface transverse to the direction of adjustment and coupled to the shaft; said second surface extending radially away from the shaft; and fluid pressure-actuated means also coupled to the shaft for engaging said second surface for moving the nut; said fluid pressure actuated means and said second surface being normally out of engagement.

3. In an adjustable coupling for the vertical head shaft of a pump structure: a driven hollow shaft extending about the head shaft and concentric therewith; coupling means between the shafts, said coupling means having a surface transverse to the axis of the shafts and including means guiding the head shaft to move vertically with respect to the coupling means; said head shaft having a threaded portion extending beyond said surface; an adjusting nut carried by said threaded portion and normally resting on said surface; means including interengaging members, one of which is carried by the head shaft, for moving the head shaft vertical to free said nut from said surface; said interengaging members being normally out of contact with each other; and coupling means surrounding the shaft and assisting in defining a space for the interengaging members.

4. In an adjustable coupling for the vertical head shaft of a pump structure: a driven hollow shaft extending about the head shaft and concentric therewith; coupling means between the shafts, said coupling means having a surface transverse to the axis of the shafts and including means guiding the head shaft to move vertically with respect to the coupling means; said head shaft having a threaded portion extending beyond said surface; an adjusting nut carried by said threaded portion and normally resting on said surface; and means including interengaging members, one of which is carried by the head shaft, for moving the head shaft vertically to free said nut from said surface; said one of the interengaging members being located above the hollow shaft and below said surface; said interengaging members being normally out of engagement with each other.

5. In an adjustable coupling for the vertical head shaft of a pump structure: a driven hollow shaft extending about the head shaft and concentric therewith; coupling means between the shafts, said coupling means having a surface transverse to the axis of the shafts and including means guiding the head shaft to move vertically with respect to the coupling means; said head shaft having a threaded portion extending beyond said surface; an adjusting nut carried by said threaded portion and normally resting on said surface; and means including interengaging members, one of which is carried by the head shaft, the other of which is a hydraulically operated plunger engaging said one interengaging member, for moving the head shaft vertically to free said nut from said surface; said one of the interengaging members being located above the hollow shaft and below said surface, and normally out of contact with the other interengaging member.

6. In an adjustable coupling for the vertical head shaft of a pump structure: a driven hollow shaft extending about the head shaft and concentric therewith; coupling means between the shafts, said coupling means having a surface transverse to the axis of the shafts and including means guiding the head shaft to move vertically with respect to the coupling means; said coupling defining a space below said surface and around the head shaft; said head shaft having a threaded portion extending beyond said surface; an adjusting nut carried by said threaded portion and normally resting on said surface; a collar fastened to the head shaft and accommodated in said space; and means for engaging and raising said collar and carried by the coupling means; said engaging means being normally out of contact with said collar.

7. In an adjustable coupling for the vertical head shaft of a pump structure: a driven hollow shaft extending about the head shaft and concentric therewith; coupling means between the shafts, said coupling means having a surface transverse to the axis of the shafts and including means guiding the head shaft to move vertically with respect to the coupling means; said coupling defining a space below said surface and around the head shaft; said head shaft having a threaded portion extending beyond said surface; an adjusting nut carried by said threaded portion and normally resting on said surface; a collar fastened to the head shaft and accommodated in said space; and a hydraulic plunger device for engaging and raising said collar and carried by the coupling means; said plunger device being normally out of contact with said collar.

8. In a mechanism for facilitating the adjustment of the axial position of a rotatable shaft having a threaded portion that carries a nut, a driving member engaging the shaft, said nut resting upon said driving member to determine the axial position of said shaft with respect to said driving member during rotation of said shaft, the combination therewith of: a collar fastened to the shaft and extending radially from the shaft; and means movable in a direction axially of the shaft for engaging the collar and for disengaging said collar, said means being normally out of engagement with said collar; said means when engaging the collar and moving it serving to free said nut from the said surface, for facilitating rotation of said nut.

9. The combination as set forth in claim 8, in which the means for engaging the collar is an annular piston and an annular cylinder for the piston, said piston and cylinder being relatively non-rotary.

10. In a mechanism for facilitating the adjustment of the axial position of a vertical pump shaft: a hollow shaft coaxial with the pump shaft; a lower coupling member carried by the hollow shaft; an upper coupling member connected to the lower coupling member and defining between them a space above the hollow shaft; said upper coupling member having an opening through which the pump shaft extends; means cooperating with the pump shaft and upper coupling member for providing a driving connection between the upper coupling member and the pump shaft for any axial adjustment of the pump shaft; a nut threaded on the pump shaft and restrained against downward movement by the upper coupling member; a collar carried by the pump shaft above the hollow shaft and below the upper coupling member; and means supported by the lower coupling member for engaging the collar to raise the pump shaft and free the nut for adjustment on the pump shaft.

11. The combination as set forth in claim 10, in which the means for engaging the collar is an annular cylinder and an annular piston surrounding both shafts, said piston being normally out of contact with the collar.

References Cited in the file of this patent

UNITED STATES PATENTS

| | | |
|---|---|---|
| 1,909,696 | List | May 16, 1933 |
| 2,085,111 | McConnell | June 29, 1937 |
| 2,284,958 | Grime | June 2, 1942 |
| 2,408,181 | Simonton | Sept. 24, 1946 |
| 2,536,638 | Greene | Jan. 2, 1951 |

FOREIGN PATENTS

| | | |
|---|---|---|
| 763,792 | France | Feb. 19, 1934 |